(12) United States Patent
Rajasekar et al.

(10) Patent No.: US 9,985,845 B2
(45) Date of Patent: May 29, 2018

(54) GENERIC USER INTERFACE CLIENT FOR SOFTWARE LOGISTICS PROCESSES

(71) Applicants: Manikandan Rajasekar, Chennai (IN); Andreas Jahr, Karlsruhe (DE); Andrey Engelko, Bad Schonborn (DE)

(72) Inventors: Manikandan Rajasekar, Chennai (IN); Andreas Jahr, Karlsruhe (DE); Andrey Engelko, Bad Schonborn (DE)

(73) Assignee: SAP SE, Walldorf (DE)

( * ) Notice: Subject to any disclaimer, the term of this patent is extended or adjusted under 35 U.S.C. 154(b) by 360 days.

(21) Appl. No.: 14/328,943

(22) Filed: Jul. 11, 2014

(65) Prior Publication Data
US 2016/0011730 A1   Jan. 14, 2016

(51) Int. Cl.
| | | |
|---|---|---|
| G06F 3/048 | (2013.01) | |
| G06F 3/00 | (2006.01) | |
| G06F 17/00 | (2006.01) | |
| G06Q 10/00 | (2012.01) | |
| H04L 12/24 | (2006.01) | |
| G06F 9/44 | (2018.01) | |

(52) U.S. Cl.
CPC ............ *H04L 41/22* (2013.01); *G06F 9/4443* (2013.01)

(58) Field of Classification Search
CPC ........ H04L 41/22; G06F 9/4443; G06F 3/048; G06F 3/00; G06F 17/00; G06Q 10/00
See application file for complete search history.

(56) References Cited

U.S. PATENT DOCUMENTS

| | | | | |
|---|---|---|---|---|
| 7,620,894 | B1 * | 11/2009 | Kahn | G06F 3/0481 715/707 |
| 2005/0076311 | A1 * | 4/2005 | Kusterer | G06F 3/0481 715/853 |
| 2005/0165822 | A1 * | 7/2005 | Yeung | G06Q 10/10 |
| 2007/0277122 | A1 * | 11/2007 | Frijlink | G06F 9/4443 715/854 |
| 2008/0077865 | A1 * | 3/2008 | Hiles | G06F 3/0481 715/708 |
| 2013/0086510 | A1 * | 4/2013 | Lee | G06F 9/4443 715/781 |
| 2014/0032276 | A1 * | 1/2014 | Abrahams | G06Q 10/067 705/7.36 |
| 2014/0380265 | A1 | 12/2014 | Driesen et al. | |
| 2014/0380274 | A1 | 12/2014 | Driesen et al. | |

* cited by examiner

*Primary Examiner* — Hugo Molina
(74) *Attorney, Agent, or Firm* — Mintz Levin Cohn Ferris Glovsky and Popeo, P.C.

(57) ABSTRACT

A system, a method, and a computer program product for providing a generic user interface client. At least one common process in a plurality of processes performed by a plurality of software programs is determined. A user interface client for managing the common process is executed. The common process is managed using the user interface client.

17 Claims, 12 Drawing Sheets

GENERIC USER INTERFACE CLIENT FOR SOFTWARE LOGISTICS PROCESSES

TECHNICAL FIELD

This disclosure relates generally to data processing and, in particular, to a generic user interface client for software logistics processes.

BACKGROUND

Software logistics ("SL") provides users with tools and processes to manage business process system landscape throughout the lifecycle of software. The lifecycle of software can include initial implementation of an application, transport of changes, and/or maintenance and/or upgrade of systems. As part of software logistics, at regular intervals in the system landscape, new building blocks and systems can be added to an existing landscape or even constructing a totally new landscape. Further, to keep system landscape running optimally, SL can provide updates to systems by providing various tools that can obtain and automatically implement various packages. SL can further assist with planning and preparing upgrades and minimize downtime.

Each SL process can be associated with a specific user interface ("UI"). User interface can be used by a user to perform various actions associated with software, e.g., update, upgrade installation, correction, transport, configuration, etc. Among the different SL processes, there exists common behavior in their UI representation. Thus, there is a need for a user interface client that can provide an interface for rendering common behaviors of the software logistics processes as well accommodating and/or implementing various custom requirements of the software tools.

SUMMARY

In some implementations, the current subject matter relates to a computer implemented method for providing a generic user interface client. The method can include determining at least one common process in a plurality of processes performed by a plurality of software programs, executing a user interface client for managing the at least one common process, and managing the at least one common process using the user interface client. At least one of the determining, the executing, and the managing can be performed on at least one processor of at least one computing system.

In some implementations, the current subject matter can include one or more of the following optional features. The plurality of processes can include at least one of the following: an upgrade process, an update installation process, a correction process, a transport process, and a configuration process.

In some implementations, managing can include at least one of the following: monitoring execution of the at least one process, configuring execution of the at least one process, error-handling of at least one error generated during execution of the at least one process, and obtaining at least one parameter associated with execution of the at least one process.

In some implementations, a user interface associated with the executed user interface client can display a plurality of processes associated with the software program. The user interface can include at least one view for displaying at least one detail associated with execution of the at least one process. Managing can include managing at least one custom process associated with a software program in the plurality of software programs using the user interface.

In some implementations, the user interface can be used to manage at least one of the following: displaying a list of available processes associated with at least one software program in the plurality of software programs, wherein the processes are displayed using at least one of the following: a tree table format, a single process format, and a grouped process format; displaying at least one detail relating to a running process of at least one software program in the plurality of software programs; initiating execution of at least one process associated with at least one software program in the plurality of software programs; connecting to at least one executing process associated with at least one software program in the plurality of software programs; and executing a plurality of processes associated with at least one software program in the plurality of software programs.

In some implementations, the user interface can be used to configure at least one parameter associated with at least one process of at least one software program in the plurality of software programs. Configuration can be performed using a dialog view associated with the user interface and generated based on a metadata description information associated with the at least one parameter.

In some implementations, the user interface can be used to control at least one element of at least one user interface dialog associated with the user interface. The element can include at least one of the following: a read only element, an editable single value element, a selectable value element, and a composition type element.

In some implementations, the user interface can be used to monitor execution of at least one process associated with at least one software program in the plurality of software programs. The monitoring can include displaying status of at least one task performed by the at least one process in the user interface.

In some implementations, the user interface can be used to display at least one custom view displaying at least one detail of at least on process associated with at least one software program in the plurality of software programs. The custom view can be added in the user interface to at least one existing view. The existing view can be used to display at least one of the following: at least one detail of the at least one process designated for displaying in the existing view and at least one additional detail of the at least one process.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
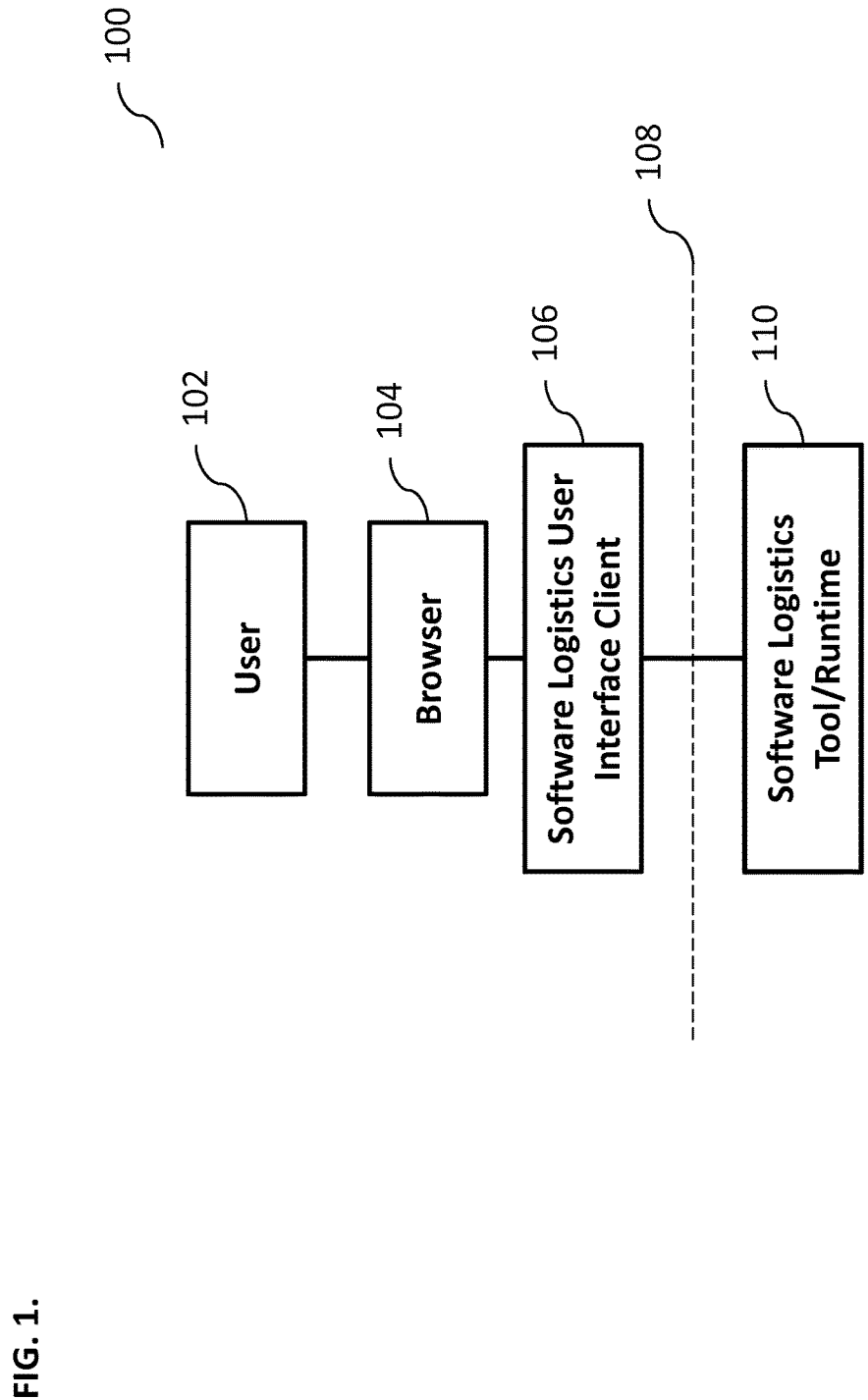
FIG. 1 illustrates an exemplary system for implementing a generic software logistics user interface client, according to some implementations of the current subject matter.

To address these and potentially other deficiencies of currently available solutions, one or more implementations of the current subject matter provide methods, systems, articles or manufacture, and the like that can, among other possible advantages, provide systems and methods for providing a generic user interface client for software logistics processes.

In some implementations, the current subject matter can relate to an easily configurable generic software logistics user interface ("SL UI") client to handle various software logistics ("SL") processes, including specific extensions, generic information display, standard data representations, etc. The SL UI client can provide various extension options for customization of software tools' specific requirements. Using SL protocol resources, SL UI client can dynamically predict flow of information handling with respect to standard behaviors of software processes, e.g., log handling, error handling, parameter gathering from users, etc. In some implementations, the SL UI client can support different modes in standard scenarios, for example, displaying a list of process in the user interface: grouped, nested, etc. In some implementations, the SL UI client can be a web application, a native mobile device application, and/or any other application that can be integrated and/or linked into other applications. In some implementations, the current subject matter can provide, a dedicated UI for each different SL process and tools with individual customization. The generic UI client can include simple, general-purpose dialogs for parameter name-value pairs and dedicated views as well as tool customizations and generic behavior.

As stated above, software logistics processes are a multitude of update, upgrade, installation, correction, transport, configuration, etc. processes of software systems. Different processes exhibit certain common behavior. The current subject matter's generic single user interface client can handle these UI functionalities and the requirements of multiple software logistics processes. The common SL UI client can act as a user interface for individual tools as well as provide ways to perform UI level orchestrating of tools and processes information. The current subject matter's generic UI client can handle variations at client configuration level of the tools/processes. Some of the standard characteristics exhibited by tools can include process execution monitoring, parameter handling, log handling, task structure display (i.e., the process structure), error handling during an execution, etc. This common behavior requires standard representations with ways of adaptations up to certain level of customizations. The SL tools can exhibit static and dynamic behaviors in terms of content (data) over the period of execution.

In some implementations, the current subject matter's UI client can provide various extension points and options for customization to the tools specific requirements. Using SL protocol resources, UI client dynamically can predict flow of information handling with respect to standard behaviors like log handling, process execution error handling, parameter gathering from users, etc. The generic UI client can support different modes in standard scenarios. An example for a mode can be a display list of processes in the UI: displaying a process list with groups based on grouping attributes can be achieved with container-based groups or tree-based nested format etc. The SL UI client can handle these variations internally without affecting the software tools. The SL UI client can be a web application which can be accessed via a standard desktop web browser and/or a mobile native web browser and/or any other application that can be integrated and/or linked into other orchestrating applications. The orchestration can be performed via a programmatic access. In case of errors and/or other unforeseen problems, the current subject matter's SL UI client can be launched remotely via a browser that can be available on the respective client's device.

In some implementations, the SL UI client can be configured to be activated in a particular user interface or a target user interface view ("target UI view"), where the target UI view can be exist in a browser. The browser can be an interface and/or environment existing in the user's system that can allow the user perform various operations associated with particular software. The SL UI client can also implement user interface dialogs ("UI dialogs") to handle various functionalities associated with running software processes, e.g., process monitoring, configuration, process execution, etc. The UI dialogs can be graphical representations that can be programmatically created by the user's system in the browser and can illustrate various details about a process, allow the user to perform various actions (e.g., monitoring, configuration, etc.), provide various information, etc.

In some implementations, the SL UI client can provide support for different modes associated with processes of software tools as well as software tools overall. The SL UI client can also allow standardization and customization of software tools, which can be performed by the user via various UI dialogs. The SL UI client can also orchestrate the views of software tools as well as allow reuse of the views. In some implementations, the SL UI client can also provide assistance to the user in handling of lists of tasks associated with software processes. It can also allow for software domain specific user interface representations as well as allow the users to perform configuration of various parameters associated with software tools, which can also be performed using various user interface dialogs.

FIG. 1 illustrates an exemplary system 100 for implementing a generic software logistics user interface client, according to some implementations of the current subject matter. The system 100 can include a browser 104, a software logistics use interface client 106, and a software logistics tool/runtime component 110. A user 102 can use the browser 104 to start or execute the SL UI client 106 that communicates with the SL tool/runtime component 110 via a communication protocol 108 (e.g., an hypertext transfer protocol ("HTTP"), HTTPS, etc.).

In some implementations, the SL UI client 106 can be a reusable UI library which can be a plug-in component into any SL tool's specific user interface. In some implementations, it can use a user interface framework (such as UI Development Toolkit for HTML5 or a UI5 framework, as developed by SAP AG, Walldorf, Germany) and can provide process selection and execution functionalities. The SL UI client 106 can implement a software logistics protocol ("SLP") and can be activated during runtime in a target user interface of the SL tool.

Figure 2:
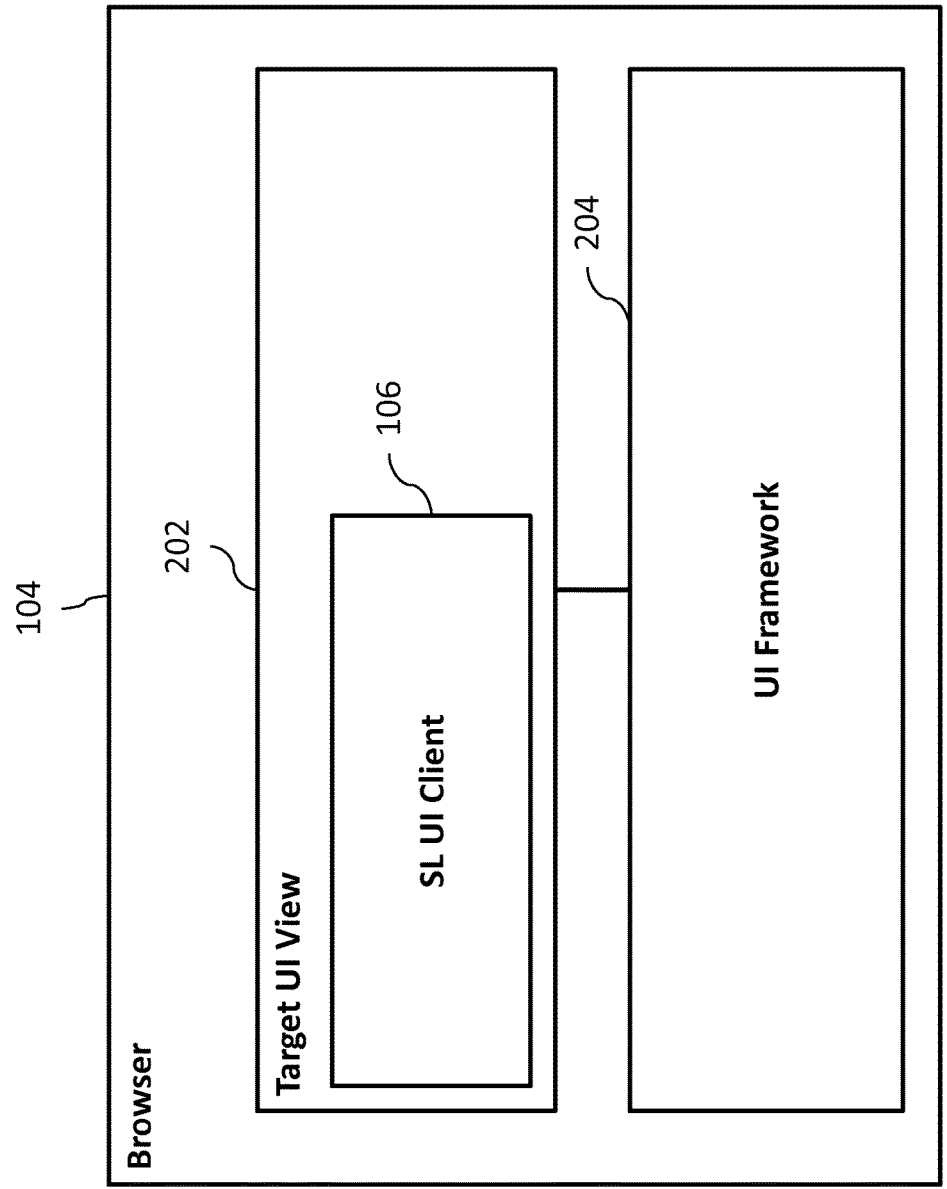
FIG. 2 illustrates an exemplary browser for implementing a generic software logistics user interface client, according to some implementations of the current subject matter.

FIG. 2 illustrates an exemplary browser 104 for implementing a generic software logistics user interface client, according to some implementations of the current subject matter. The browser 104 can include a target user interface view 202 that can incorporate SL UI client 106. The target UI view 202 can be coupled to the user interface framework 204. In some implementations, the SL UI client 106 can be deployed in individual tools runtime along with other modules of the user interface framework 204.

Figure 3:
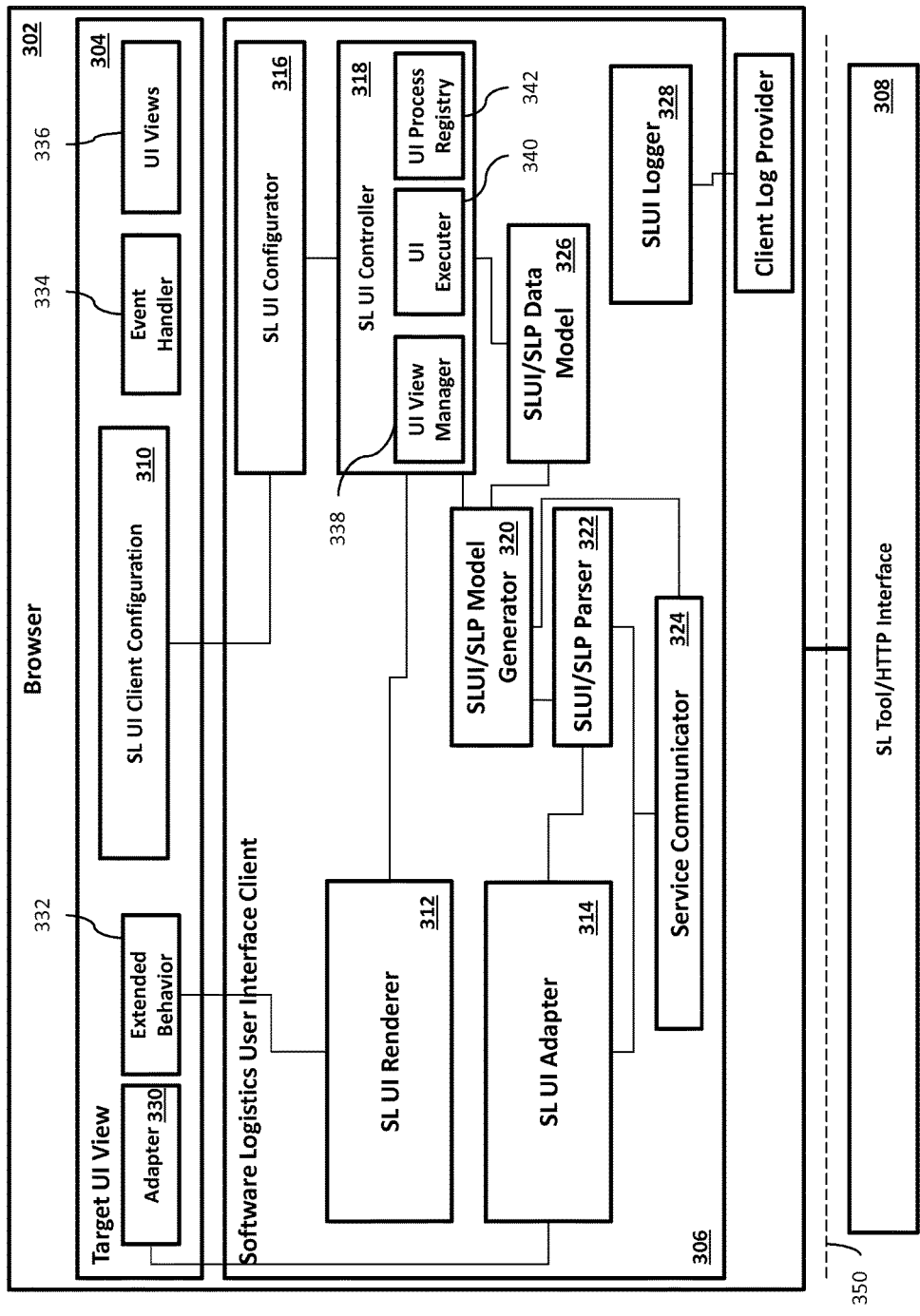
FIG. 3 illustrates an exemplary browser containing details of implementation of a generic software logistics user interface client, according to some implementations of the current subject matter.

FIG. 3 illustrates an exemplary browser 302 component running a generic software logistics user interface client, according to some implementations of the current subject matter. The browser 302 can include a target UI view 304, a SL UI client 306, where the browser 302 can communicate with a specific SL tool 308. The browser 302 can assist the user (such as user 102 shown in FIG. 1) in performing various functionalities, e.g., update, upgrade installation, correction, transport, configuration, etc. associated with the SL tool 308. The target UI view 304 can include a SL UI client configuration component 310 along with an adapter 330, an extended behavior component 332, an event handler component 334, and a UT views component 336. The SL UI configuration component 310 can include a UT configuration data model.

The SL UI client 306 can include an SL UI renderer component 312, a SL UI adapter component 314, a SL UI configurator component 316, a SL UI controller component 318, a software logistics user interface/software logistics protocol ("SLUI/SLP") model generator component 320, a SLUI/SLP parser component 322, a service communicator component 324, a SLUI/SLP data model component 326, and a software logistics user interface ("SLUI") logger component 328. Each of these components can be implemented in hardware, software, and/or both.

The SL UI renderer component 312 can include one or more renderers. The renderers can be a UI view renderer, a UT control renderer, a complex renderer, a simple renderer, and/or any other renderers. The UI view renderer component can be responsible for graphically rendering standard views and user interface patterns of the SL UI client. These can include a summary view, a success view, a process monitor view, etc. One or more of these views can indicate to the user the status of a particular process associated with a software logistics tool. It can also indicate whether or not a particular function in the process has successfully completed its execution or whether or not there is an error associated with an execution of the function. The simple renderer component can be responsible for graphically rendering standard simple UT control, such as text input, text label, text area, radio button, a note (e.g., SAP Note by SAP AG, Walldorf, Germany) number link, a help (e.g., SAP Help by SAP AG, Walldorf, Germany) link, etc. The complex renderer component can be responsible for graphically rendering complex controls of the UI, such as, providing a process data table, a process tree table, a radio button group, etc. The above functionalities can accommodate various common processes of software tools. In some implementations, the renderers can provide various extended functionalities to accommodate various custom behaviors in terms of events and/or algorithms associated with software processes.

The SL UI adapter component 314 can act as a delegate to the browser's 302 Extensible Style sheet Language Transformations ("XSLT") preprocessor for performing rule-based adaption of UI dialogs. It can include a registry table for adapters' registration via SL UI configurator component 316.

The SL UI configurator component 316 can be an interface to a consuming application. The SL UI configuration component 316 can expose application programming interfaces and configuration properties which can be declared in the target UIs. It can also read configuration information and provide details to SL UI controller component 318 for further processing.

The SL UI controller component 318 can coordinate between different modules, synchronize operation on various modules of the SL UI client 306 as well any external modules. The SL UI controller component 318 can read UI configuration information declared in the target UI view via the SL UI configurator component 316 and pass processing to further modules. The SL UI controller component 318 can include UI view manager module 338, a UI executer module 340, and a UI process registry module 342. The UI view manager module 338 can act as a UI view orchestrator. It can dynamically change views, replace existing views with custom views, update views and controls with requisite information. UI view manager module 338 can synchronize its operation with the UI executor module 340, the UI process registry module 342, as well as other configuration aspects. The UI executor module can maintain all possible UI-related activities and orchestrate the SLP model to SL UI controls and view renderers. The UI executor module 340 can maintain relevant information for a specific process execution cycle. The UI executor module 340 can further maintain an entire execution session of a process. The UI process registry module 342 can act as a container for a list of processes. In some implementations, when the SL UI client 306 initializes, the UI process registry module 342 can load all processes from a backend (e.g., a default SLP uniform resource locator ("URL"), a configuration URL, and/or any other URL) and maintain a reference to the list of all processes (such as by using a java script object, and/or any other way).

The SLUI/SLP model generator component 320 can be a mapper from SLP/SL UI compliance extensible markup language ("XML") schema to user interface framework's XML model or java script object notation ("JSON") to user interface framework's JSON model. It can implement a SLUI/SLP data model 326, which can be stored and accessible to the SLUI/SLP model generator 320.

The SLUI/SLP parser component 322 can parse incoming data from a service layer and determine whether to handle the data to the corresponding model generator operation. The SLUI/SLP parser component 322 can be XML-to-JSON, JSON-to-XML converter and/or any other converter in case of multiple data format handling in the application as well as validation of incoming data from a service before direct processing.

The service communicator 324 can generate a request to the backend using various HTTP headers in an asynchronous or a synchronous manner. The service communicator can frequently check connectivity between the UI and backend servers during entire lifecycle of the SL UI client 306 in the browser 302.

The SL UI logger component 328 can be responsible for tracing entire activity in the SL UI client 306 to browser's 302 logs in user interface flow format.

In addition to the above components, the current subject matter can include an extension register, which can be a registration mechanism in which the custom code of a target UI application can be registered for responding to certain events as well as can used to overload certain events. The SL UI client can further include a resource handler for resource loading and resource handling.

Figure 4:
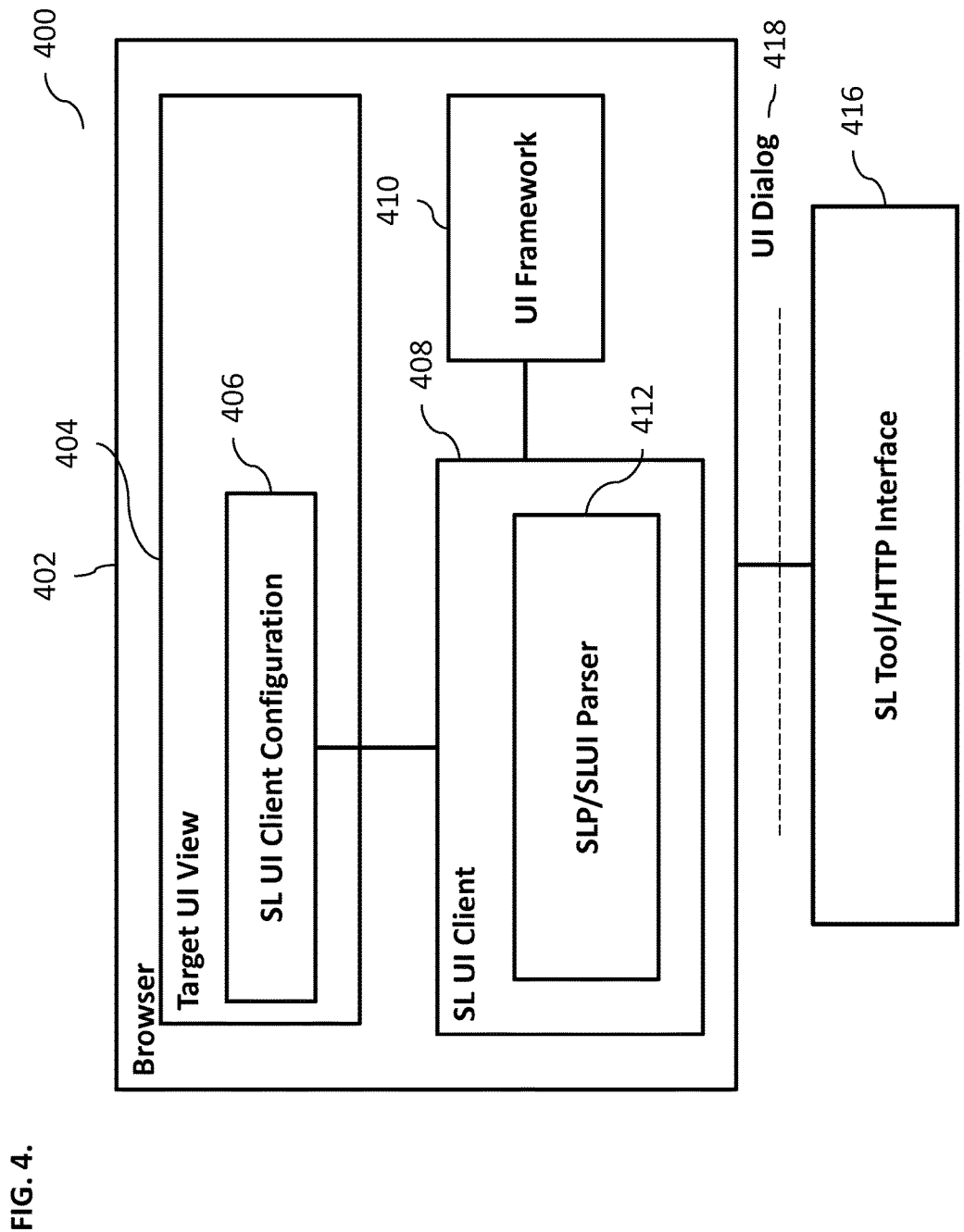
FIG. 4 illustrates an exemplary standard behavior with respect to user interface dialog metadata handling and parsing, according to some implementations of the current subject matter.

In some implementations, the SL UI client can provide dialog handling capabilities. FIG. 4 illustrates an exemplary standard behavior with respect to UI dialog metadata, according to some implementations of the current subject matter. The browser 402 can include a target UI view 404 having a SL UI client configuration component 406, a SL UI client 408 that includes a SLUI/SLP parser component 412, and a user interface network 410. The browser 402 can communicate with the SL tool/http interface 416 using a user interface dialog 418. The UI dialog 418 can ensure that the input XML/JSON formats of data are in compliance with a SL protocol schema for various URL resource mapping responses, such as monitoring, process definition, process actions, etc., and UI dialog formats. In a standard scenario SL UI client can directly take the response data and proceeds using SLUI/SLP parser 412 to determine the input data to SL UI client related information with respect to different SLP resource mapping, including UI dialogs.

Figure 5:
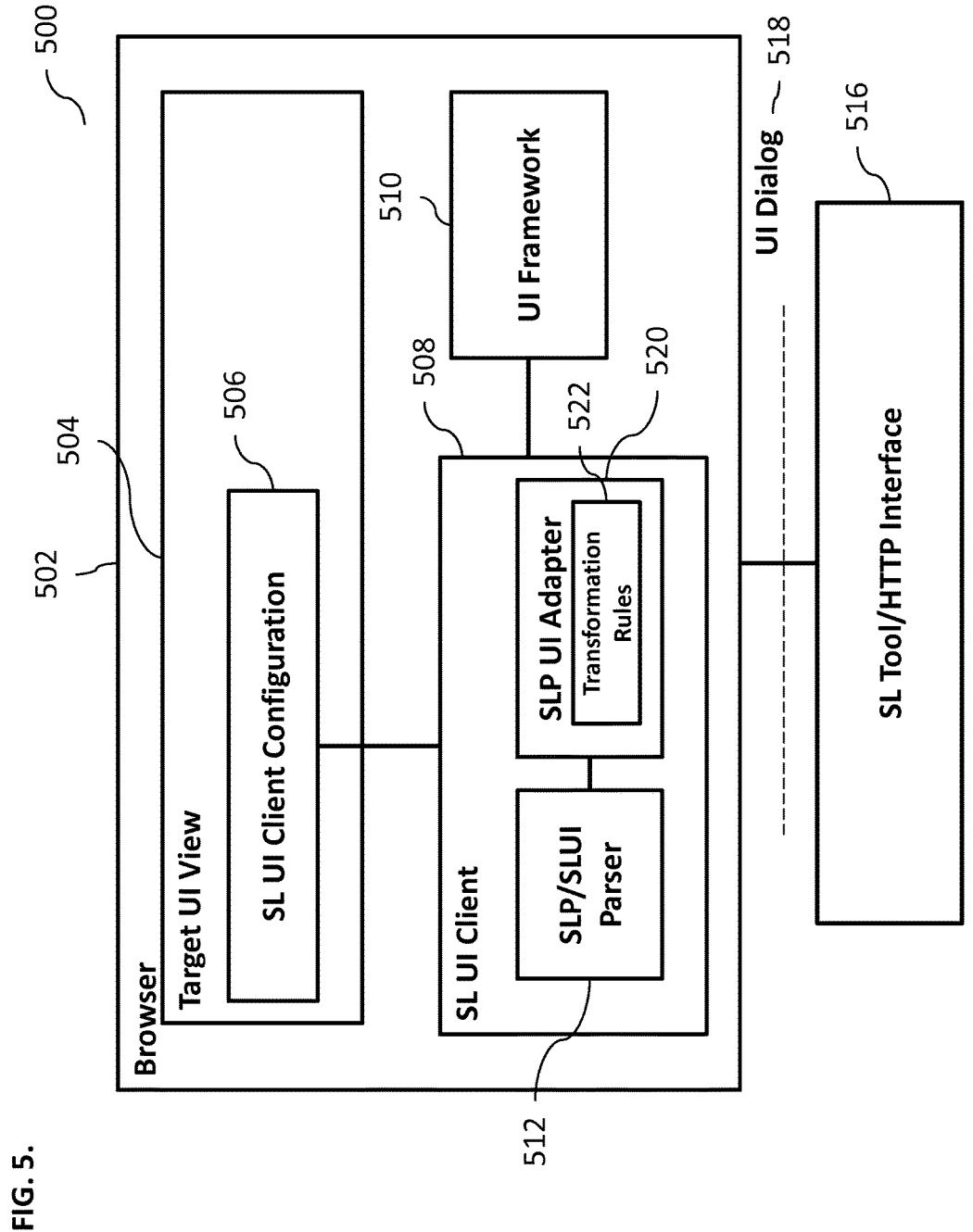
FIG. 5 illustrates an exemplary browser including a target user interface view containing dialog metadata adapter extensions, according to some implementations of the current subject matter.

In cases of application which does not follow SL UI client schema for UI dialogs, an adapter component can be provided for use with the SL UI client. The adapter component can include a rules adapter and a custom adapter. FIG. 5 illustrates an exemplary browser 502 that can include a target UI view 504 having a SL UI client configuration component 506, a SL UI client 508 having a SLUI/SLP parser component 512 and SLP UI adapter 520, and a user interface framework 510. The SLP UI adapter can include transformation rules component 522 that can provide standard and custom rules that can process objects of the SL UI client (e.g., Java script objects, SL UI client APIs, etc.). In some implementations, a rules adapter technique can be implemented using an XSLT preprocessor component in the browser 502. Using this technique, non-SL UI client schema dialogs can be transformed into SL UI client dialog schema dialogs. Upon completing the transformation, an XML document can be generated for further processing. Rule specific adapter can obtain a rule file/transformation file (i.e., an XSL file) from a location of the project and map it to the response of a particular response data. The XSL file and input data can be processed by the XSLT preprocessor of the browser. In some implementations, multiple rules/transformations can exist for different UI dialog responses.

Figure 6:
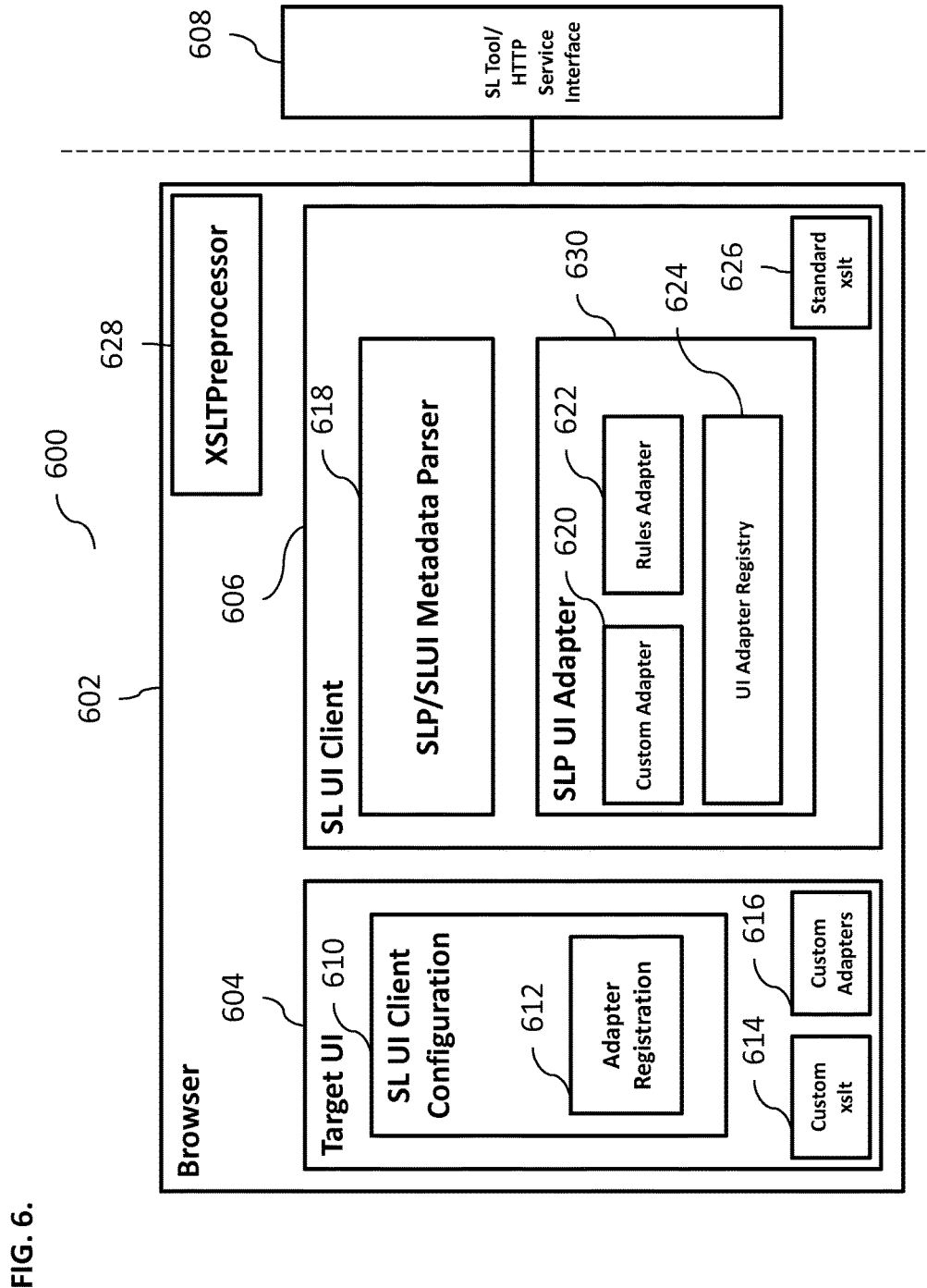
FIG. 6 illustrates an exemplary adapter component including different types and registry, according to some implementations of the current subject matter.

FIG. 6 illustrates an exemplary adapter component, according to some implementations of the current subject matter. As shown in FIG. 6, a browser 602 can include a target user interface 604, a SL UI client 606 and an XSLT preprocessor 628. The target UI 604 can include a SL UI client configuration component 610 that can include an adapter registration component 612. The target UI 604 can also include various custom rules and adaptors 614, 616. The SL UI client 6060 can include a SLUI/SLP metadata parser 618, a SLP UI adapter 630, and a set of standard rules 626. The SLP UI adapter 630 can include a custom adapter component 620, a rules adapter component 622, and UI adapter registry 624. The UI adapter registry 624 can include adapter type, adapter reference, and/or any URL paths for the adapters.

In operation, custom rules 614, custom adapters 616, can be registered via SL UI client configuration component 610 using adapter registration component 612. Once the adapters are registered, the adapters' custom rules 614, custom adapters 616, standard rules 626 can be mapped to the UI adapter registry component 624. After mapping of the adapter's customer and standard rules as well as custom adapters, the adapter 630 can be used to work with the UI dialogs. When using standard rules 626, UI dialog metadata can be mapped by issuing a request for a URL path to the UI adapter registry 624. The rules adapter 622 can load a rule and a response data to XSLT preprocessor 628. The XSLT preprocessor 628 can provide the rules adapter 622 with a response of transformation of the provided data. The adapted response data can be used further in the client with SL UI metadata parser 618.

When custom rules 614 are used, the UI dialog response metadata, i.e., a request for URL, can be mapped to the UI adapter registry component 624. Then, the rules adapter 622 can provide custom rule and response data to the XSLT preprocessor 628. The XSLT preprocessor 628 performs transformation of the received data, and provides the results to the rules adapter 624. The adapted response data can be used further in the client with SLUI metadata parser 618.

When custom functions/adapters 616 are used, the UI dialog metadata, i.e., a request for a URL, can be mapped to the UI adapter registry 624. The custom adapter 620 can then load the custom adapter function reference and response data. Custom function execution can return the adapter response back to the custom adapter 620. The adapted response data can be used further in the client with SLUI metadata parser 618.

In some implementations, the standard rules can be used as SL UI client types and custom rules can be mapped in the adapter registration section of the configuration. In case of deviations from standard SL protocol URL patterns, it can be specified in the SL UI client configuration in the target UI along with transformation rules how handle transformation of custom data format into standard SLP metadata format.

Figure 7:
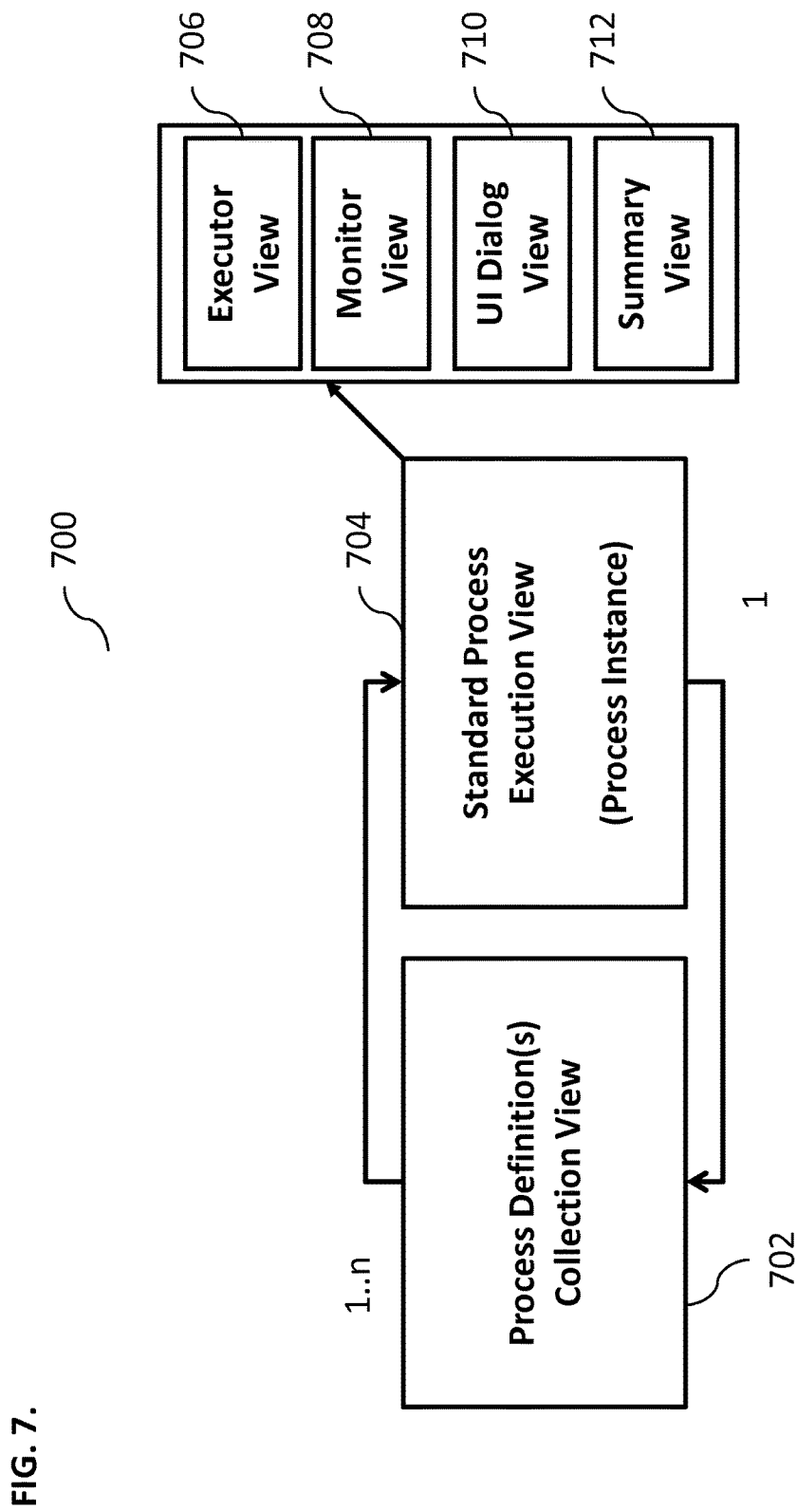
FIG. 7 illustrates exemplary context and structure of user interface views, according to some implementations of the current subject matter.

FIG. 7 illustrates exemplary context and structure of a user interface 700, according to some implementations of the current subject matter. The user interface 700 can include process definition(s) collection view 702 and a standard process execution view 704, which can correspond to a process instance. The collection view 702 can include a plurality of process definitions 1 . . . n. The execution view 704 can include a single process instance. The execution view 704 can also include an executor view 706, a monitor view 708, a UI dialog view 710, and a summary view 712.

In some implementations, the UI can display all process definitions in a list format. If a particular process definition is selected, a standard process instance view 704 can be generated that can contain details of process execution information, e.g., process status, UI dialogs, execution console, execution control, execution summary, etc. Once process execution is finished, UI can turn to process definition list display view. A standard execution can have an execution screen with current process state/step information, progress information and/or a set of dialog screens with a summary of process execution. Any additional process behavior can be also included in the view.

In some implementations, the SL UI client can include a shell user interface framework (such as, UI Development Toolkit for HTML5 or a UI5 framework, as developed by SAP AG, Walldorf, Germany) as a root user interface container. Inside the shell framework, SL UI client process definitions and process execution views can be provided. The SL UI client shell can be accessible using consumption tools via an API. The shell framework can extend the user interface with respect to providing different extension points, such as work set Items, navigation items, header items, panel bar items, etc. The SL UI client's shell framework can also provide extensibility to place custom required UI modules inside the user interface. Further, application programming interfaces can be included to provide access to certain parts of SL UI client's objects, e.g., data model, renderer extensions, etc.

Figure 8:
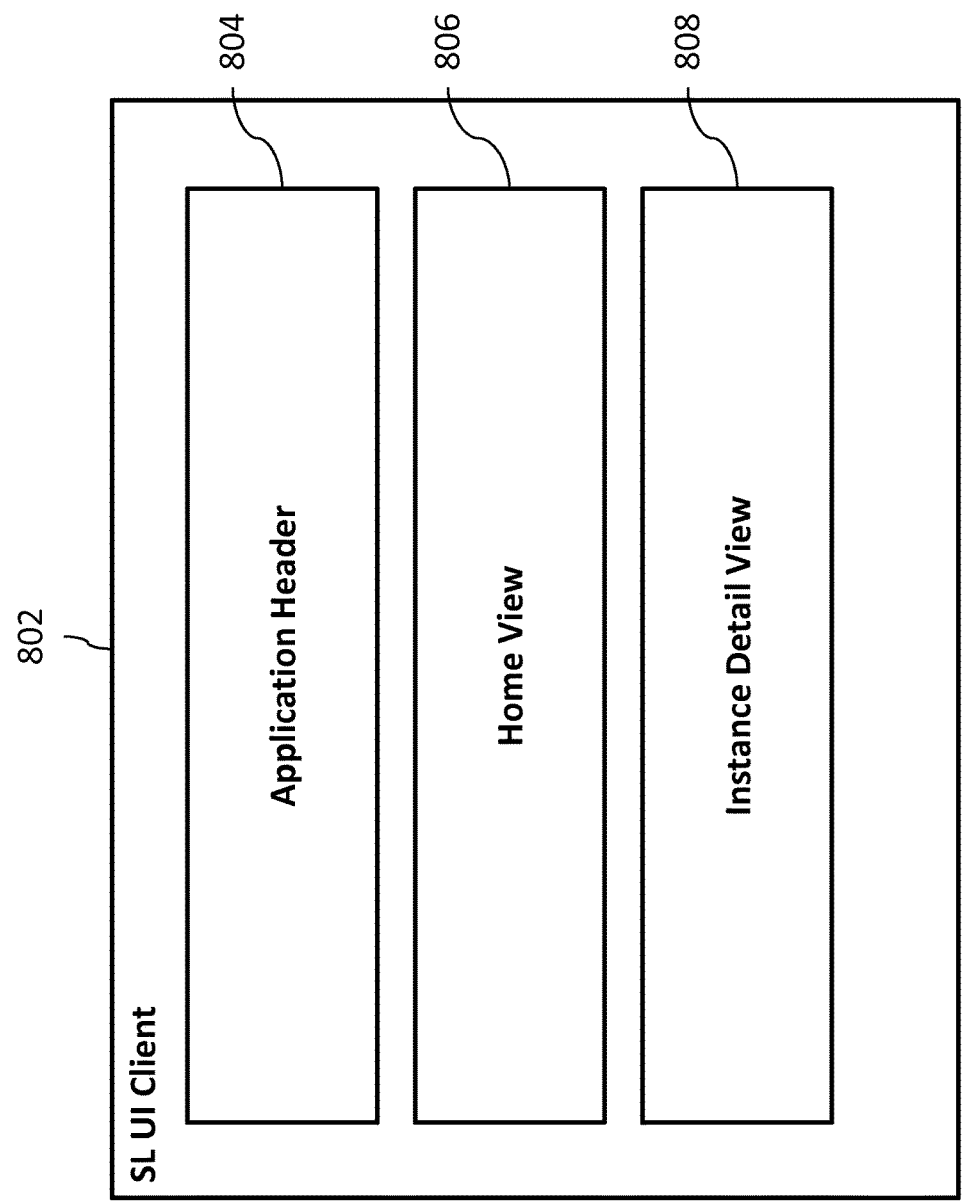
FIG. 8 illustrates an exemplary user interface view structure, according to some implementations of the current subject matter.

FIG. 8 illustrates an exemplary user interface view structure 802, according to some implementations of the current subject matter. The view structure 802 can include an application header view component 804, a home view component 806, and an instance detail view component 808. The application header view component 804 can include information about application information view, user information view, application help view, etc. The views in the application header view component 804 can be configurable in SL UI client configuration.

The home view component 806 can include a grouped process view, a list based view, tree list based view, a single process information view, etc. This view can cover process definitions display. Along with process definitions, the home view component can also display a short summary about the process. The views in the home view component 806 can be configurable in SL UI client configuration.

The instance details view 808 can include process execution information view, execution status view, execution progress details view, error handling and validation messages view, execution controls (e.g., next, back, close, cancel, etc.) view, summary information view, etc.

Figure 9:
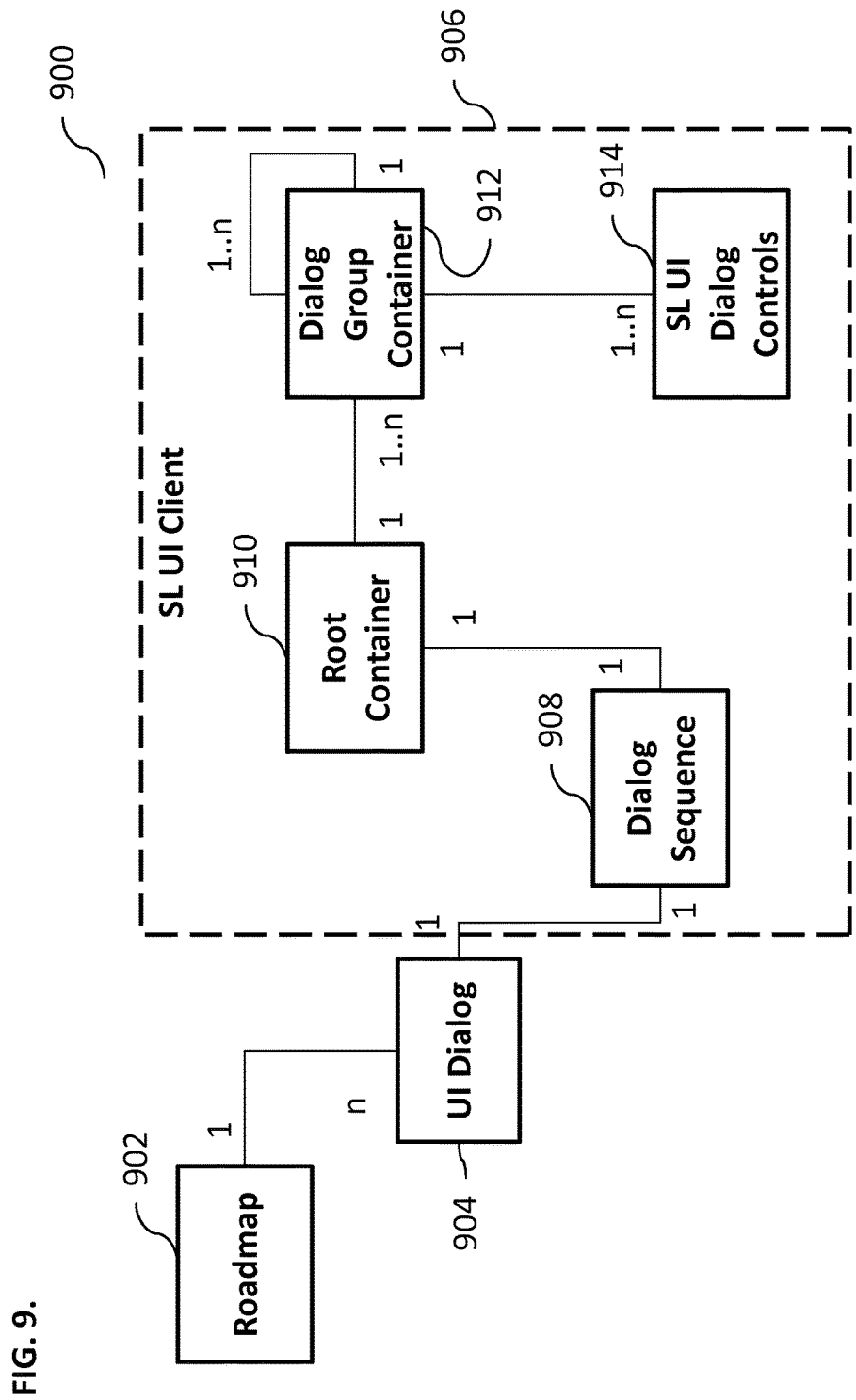
FIG. 9 illustrates an exemplary process for mapping user interface dialogs to a rendering structure, according to some implementations of the current subject matter.

In some implementations, during operation, the SL UI client can render various user interface dialogs that can assist the user in performing various operations with regard to processes of a particular software tool. In some implementations, the SL UI's client's instance detail view can be used to render UI dialogs. Each UI dialog can include its own structure and hierarchy. FIG. 9 illustrates an exemplary process 900 for mapping UI dialogs to a rendering structure, according to some implementations of the current subject matter. The process 900 can be performed to render dialog inputs in a synchronized fashion with process information and execution views. The process 900 can begin with a single roadmap (lmsl.slpp.roadmap) operation, at 902, that can have a plurality (1, 2, . . . , n, n being an integer) of UI dialogs associated with it. However, a single UI dialog can be rendered at a time, at 904.

To allow the user to know how many and/or what input parameters are being captured over different dialogs in same roadmap 902, a dialogue sequence can be used, at 908. The dialog sequence can be a registry of header information indicative of different UI dialogs and can be used to illustrate to the user what each dialog can represent. The dialog sequence 902 can be part of the SL UI client 906, which can capture dialog data. Once the header information about UI dialogs is captured by the dialog sequence 902, each UI dialog can be rendered inside a root container 910 contained within the SL UI client 906. A dialog group container 912 can be used to obtain information from the root container 910 as well as implement and/or support SL UI dialog controls 914. The UI dialog controls can include at least one of the following: a text input, secure inputs, a number inputs text view, a checkbox group, a radio button group, a file upload, a drop down box, a note (e.g., SAP Note by SAP AG, Walldorf, Germany) number link, a help (e.g., SAP Help by SAP AG, Walldorf, Germany) link, a date picker, a list box, a file browser, a progress bar, an information box, a related link, a tree data table, a data table, a group container, confirm password, a user login, system details, feedback forms, and/or any other UI dialog controls.

Figure 10:
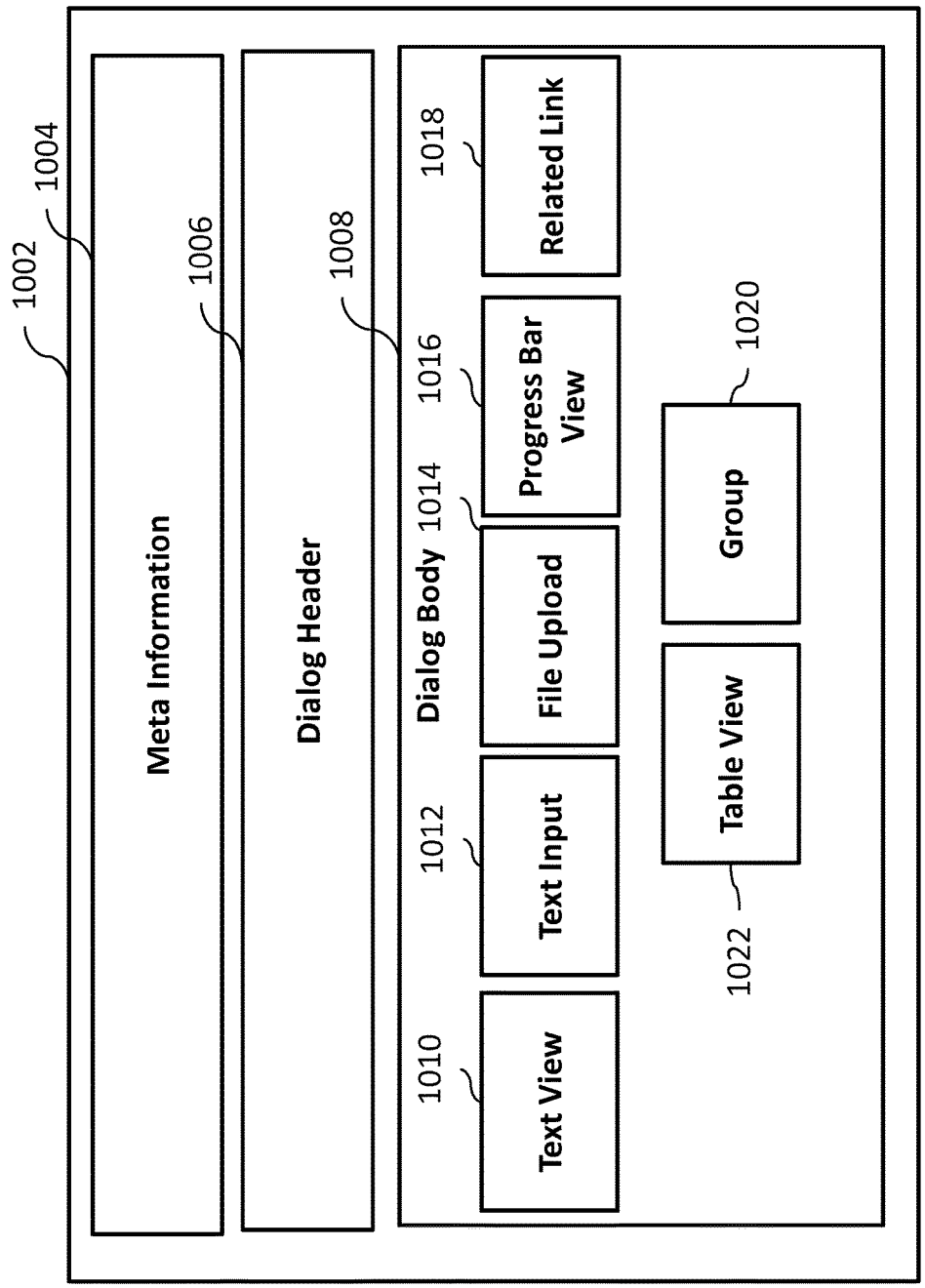
FIG. 10 illustrates an exemplary user interface dialog structure, according to some implementations of the current subject matter.

FIG. 10 illustrates an exemplary UI dialog structure 1002, according to some implementations of the current subject matter. The UI dialog 1002 can include a meta information component 1004, a dialog header component 1006, and a dialog body component 1008. The following exemplary XML can be used to generate a UI dialog

```
<dialogs>
    <dialog display="true [default] \false">
    <id/>
    <aboutDialogHelp refLink="true [default] \false"/>
    <metadaInformation id="{idOfMetaDialog}"/>
            <dialogHeader enableMinimize="true \ false [default]"
                    enableMaximize="true \ false [default]">
                <caption headerSize="regular
                [default] \Medium \ large "/>
                <longDescription showAsInfo=
                "true \ false [default]"/>
            </dialogHeader>
            <dialogBody>
                    <! -- UI Elements will be placed here! -->
            </dialogBody>
    </dialog>
</dialogs>
```

The meta information component 1004 can provide information identifying a UI dialog, e.g., a UI dialog identifier, and/or any other information. The dialog header component 1006 can include information describing the UI dialog. It can also include caption information that can provide the user with a further description of the UI dialog contents. The dialog body component 1008 can include various child elements, such as, text view element 1010, text input element 1012, file upload element 1014, progress bar view element 1016, related link element 1018, group element 1020, table view element 1022, and/or any other elements. The elements can be divided into at least the following four categories: read only elements, freely editable single value elements, selectable value elements, and composition type elements. The read only elements can provide read only information to the user on the user interface, for example, text views, related links, etc. The freely editable single value elements can allow users to enter free texts/free data without any pre-defined constraints in order to map simple parameter structures. The selectable value elements can include pre-defined set of values that can be shown to users. In this case, the user can select one element from the plurality of selectable value elements as a value for a simple parameter structure. The composition type elements can include a table element which can be composed of three other categories of elements discussed above in order to map complex structure of parameters. This category of elements can also deal with domain specific entity representation (e.g., SAP Note by SAP AG, Walldorf, Germany, which can render information with SAP note icon and redirect the user to specific set of information described by a meta dialog). In some implementations, system login controls, user creation control, password confirmation control can be specifically meant to increase the domain specific user interface representation. Further, in some implementations, a SL feedback form can be a composition element which can gather feedbacks about the SL process execution and provide appropriate triggers. The UI dialog can be used to monitor execution of processes associated with software, perform configuration of the software processes, perform error checking, resolve errors, perform validation of various configuration parameters, execute various browser functionalities, etc.

In some implementations, the SL UI client can be reusable across a variety of software tools. To allow for such reuse of the SL UI client, during software tool's development stage, a backend interface can be provided that can include a web application/web resource and tools to deploy the SL UI client library during runtime stage of software tool. During development stage, SL UI client artifacts and/or any other user interface framework artifacts can be supplied into a web resource component of the software tool. While the web resource component can be accessed by browser, individual tools can deliver their own copy of SL UI client along with user interface framework.

In some implementations, the SL UI client can be designed to be generic and reusable across various software tools of different computing platforms. In some exemplary implementations, the SL UI client can be a browser based java script library that can depend on a server side implementation of a software logistics protocol.

In some implementations, the SL UI client can be used to support different modes of software logistics tools. In particular, the SL UI client can support different modes of SL process execution without any additional modification or creation of any additional UI artifacts. The SL UI client can reuse its views/sub-views and/or provide a standard user interface that can allow the SL UI client to support different modes of the software tool. The software modes can include different aspects of the software, such as, an observer mode (e.g., read only mode), an administrative mode (e.g., read and write modes, which allow views for writing data to backend), etc., for which the SL UI client can create appropriate views to allow appropriate monitoring, configuration, and/or handling.

In some implementations, in order to support different modes of a software tool, the SL UI client can provide a list of configuration options for the software tool and a view composition sequence technique based on a software logistics protocol to allow it to handle different characteristics of the user interface modes. In some implementations, the SL UI client can be designed with a view (and/or sub-view) separation that can allow the SL UI client to predict, monitor, configure, handle, etc. different modes of the software tool while SL UI client is being initialized in a browser, where respective views can be appropriate created. One example can include displaying a list of available processes from a software tool in a remote user interface. In that regard, the SL UI client can be used to display at least one of the following: a list of processes in a table format, a list of nested processes in tree table format, a single process, a rendering as a list of groups of processes as a group of container tables, etc. Another example can include displaying a user interface for starting processes from the SL UI client as well as displaying a user interface for already running processes' execution. Rendering details can be related to a single process execution as well as executions of multiple processes.

In some implementations, the SL UI client can be used to standardize user interfaces and provide customization of software tools. Software tools include a substantial majority of standard behavior that can be common among the processes. The SL UI client can be used to standardize such common characteristics of software tools, e.g., monitoring of a process execution with required monitoring details, viewing the process execution's task hierarchy with runtime information, error handling during process execution and displaying logs of a particular process operation, etc. Further, SL UI client can provide flexibility in customizing handling of configuration (e.g., by setting configuration parameters, etc.) for each software process. To do so, the SL UI client can implement at least one common view for displaying process details and process execution details with home view and instance detail view (e.g., execution view). The home view can include a trigger (e.g., start) for a process execution and display static information concerning a process. The execution view can provide dynamic information such as, current roadmaps during process execution, monitor details of process execution, available actions during process execution's life cycle, error details, dialogs for parameter input as a configuration wizard, and/or any other information. The configuration wizard can include meta-dialog information that can be provided via SLP dialog resource. The dialog resource can correspond to at least one configuration resource (which can exhibit bare process parameters for setting) and include meta description of the rendering of the parameters, such as, user interface control description, positioning and/or grouping of configuration parameters, etc. The dialog resource can also provide a dynamic mapping with configuration parameters resource to the user interface element in order to compile the data to backend. The meta-description can also allow defining a configuration view. The SL UI client can interpret these descriptions and render the dialog according to this description.

In some implementations, the SL UI client can operate as an orchestrator of various user interface views. The software logistics tools and/or processes can offer additional services and features to the landscape administrators in addition to their standard services. In those cases, the generic user interface client can provide a user interface extension mechanism to the software tools to add its own custom feature user interface. On such exemplar can include software utilities (e.g., services) along with standard process execution. In some implementations, the SL UI client can behave as a user interface component of a single view for software tools to provide standard execution and monitoring use case. The SL UI client can dynamically behave as a frame composed of many different user interface views under a single shell for delegating additional use cases of tools. This can be programmatically configured in the SL UI client by the software logistics tools.

In some implementations, the SL UI client views can be reused. The software logistics tools can require certain special user interface views on top of existing user interface to show additional information about process execution. For example, the software logistics tools can require break points view-displays list of breakpoints (where a break point can be a defined point in time to interrupt process execution and wait until told to resume the process) of process execution. In this case, a custom view displaying such breakpoint lists can be added along with standard views as a user interface extension. The SL UI client can allow users to reuse the existing views for depicting additional information apart from already designed information, such as for displaying breakpoint lists, and/or any other information. The SL UI client can also adjust and/or customize existing standard views, such as, execution status display view to depict more information along with standard depiction.

In some implementations, the SL UI client can allow addition of views to existing user interface shell frame either as a top level to depict a new category of information to the tool and/or add to side level to depict child level information of a process execution and/or process itself (e.g., in a home view). Further, the SL UI client can provide user interface level APIs to access client-created objects, such as, for example, process definition, monitoring info, process execution, process collection repository, service communication, utilities, etc. This mechanism can allow reuse of existing client infrastructure along with extensions, where various objects for the views can be defined with certain predefined methods and/or behaviors that may be required on a user interface layer.

In some implementations, the SL UI client can provide task list handling. The software logistics processes can be long running procedures, which can present a challenge to standard monitoring scenarios. The SL UI client can perform such monitoring to obtain overall procedure status and its details. The overall procedure structure detail can include process, roadmap and/or task steps details. To minimize data traffic, the monitor resource can provide information about currently executing step status (e.g., task step can be a leaf level information in the entire task hierarchy) with a low polling frequency. The task list structure in the user interface can show previous tasks either in initial state and/or inconsistent state, and/or finished state. In some implementations, the SL UI client can obtain a SLP monitor resource and uses it in a task list by mapping task identifiers to update its status. The SL UI client can provide a task identifier and status of a task in a report. Along with updating the status of a current task, the previously specified tasked or missed tasks can be set to finished status. The SL UI client can combine roadmap type and task step type information from the monitoring. In some case, the software logistics process can stop execution of a process while facing an error in execution; however, other status values can be grouped as process execution category, which can indicate that the process is continuing to run. The SL UI client can handle such forward and backward movement of task execution and update the task list hierarchy properly.

In some implementations, the SL UI client can handle software logistics domain-specific user interface representations. There exist common entities that can be actively used in various process execution scenarios among software logistics processes domain. The SL UI client can provide a standard user interface control (e.g., composition of controls) for the common entities such that they are easily reusable in the SL UI client and a specification via a dialog resource. The SL UI client can provide reusable user interface components/controls for software logistics processes specific entities, which can include at least one of the following: systems details, analytics, feedback form, user confirmation password, user password creation, note, process execution reports, reset password, etc. These entities can be defined using standard user interface behaviors and/or features. The reusable controls can reduce complexity on the user interface handling as well as meta-dialog declaration from the tools.

In some implementations, the SL UI client can provide configuration parameter handling. The SL UI client can provide orchestration of a process during runtime and/or dynamic parameter generation (parameters can be unknown during start of process execution) by providing an intelligent configuration parameter handling mechanism. The SL UI client can provide an appropriate user interface meta language information due to missing (not implemented) dialog resource. The software logistics protocol components may require that tools implement SLP configuration resource to expose information about configuration parameters relating to process execution. The SL UI client can construct dynamic dialog resource objects using configuration parameter information. These user interface dialog objects can be used to render configuration parameters as user interface controls. The SL UI client can follows an object template approach by which the dialog objects can be generated from the configuration resource by mapping configuration parameter identifier. The dialog objects can generate label-text field pairs and can be extended to support label-value selector type.

Figure 11:
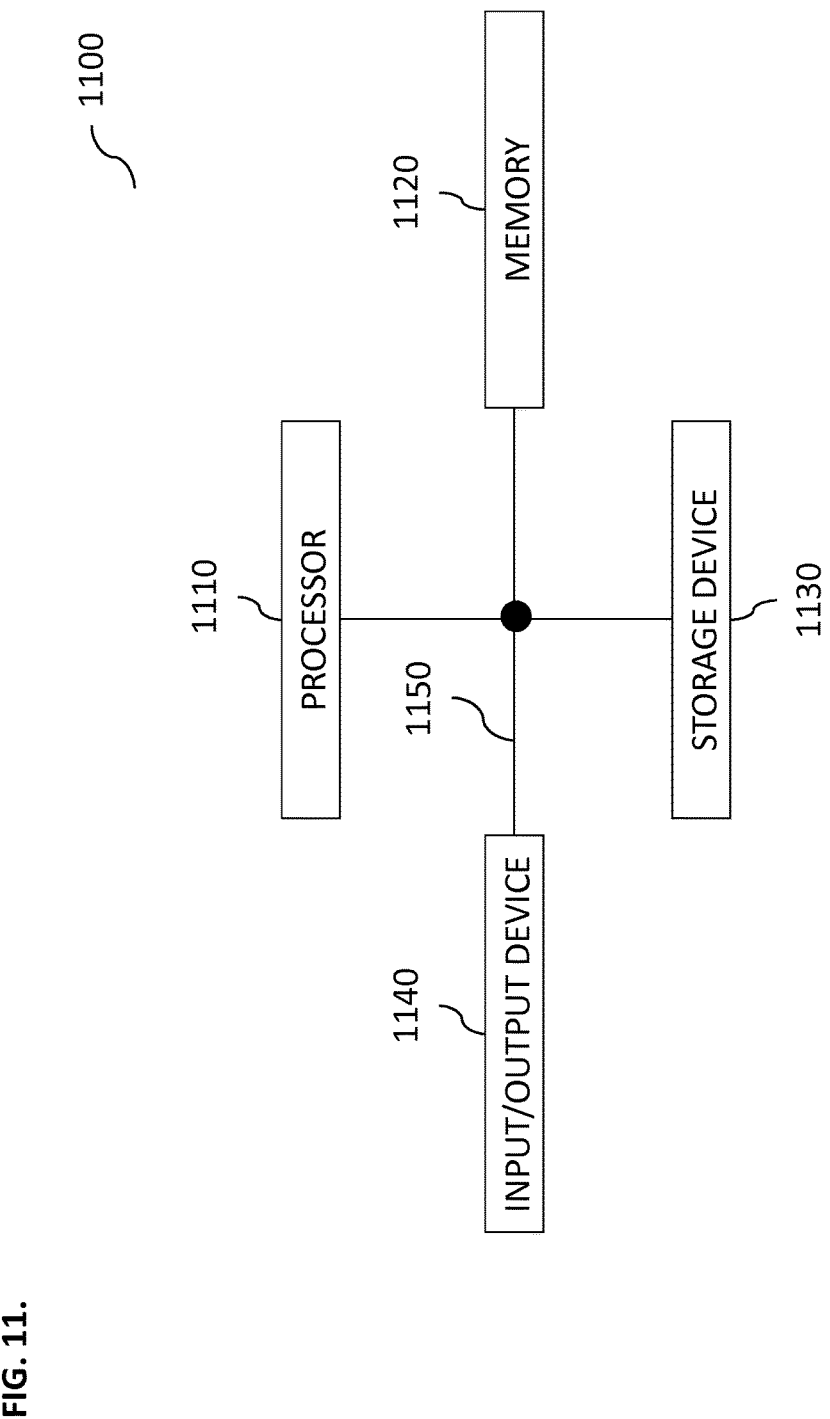
FIG. 11 is an exemplary system, according to some implementations of the current subject matter.

In some implementations, the current subject matter can be configured to be implemented in a system 1100, as shown in FIG. 11. The system 1100 can include a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 1100. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/ output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
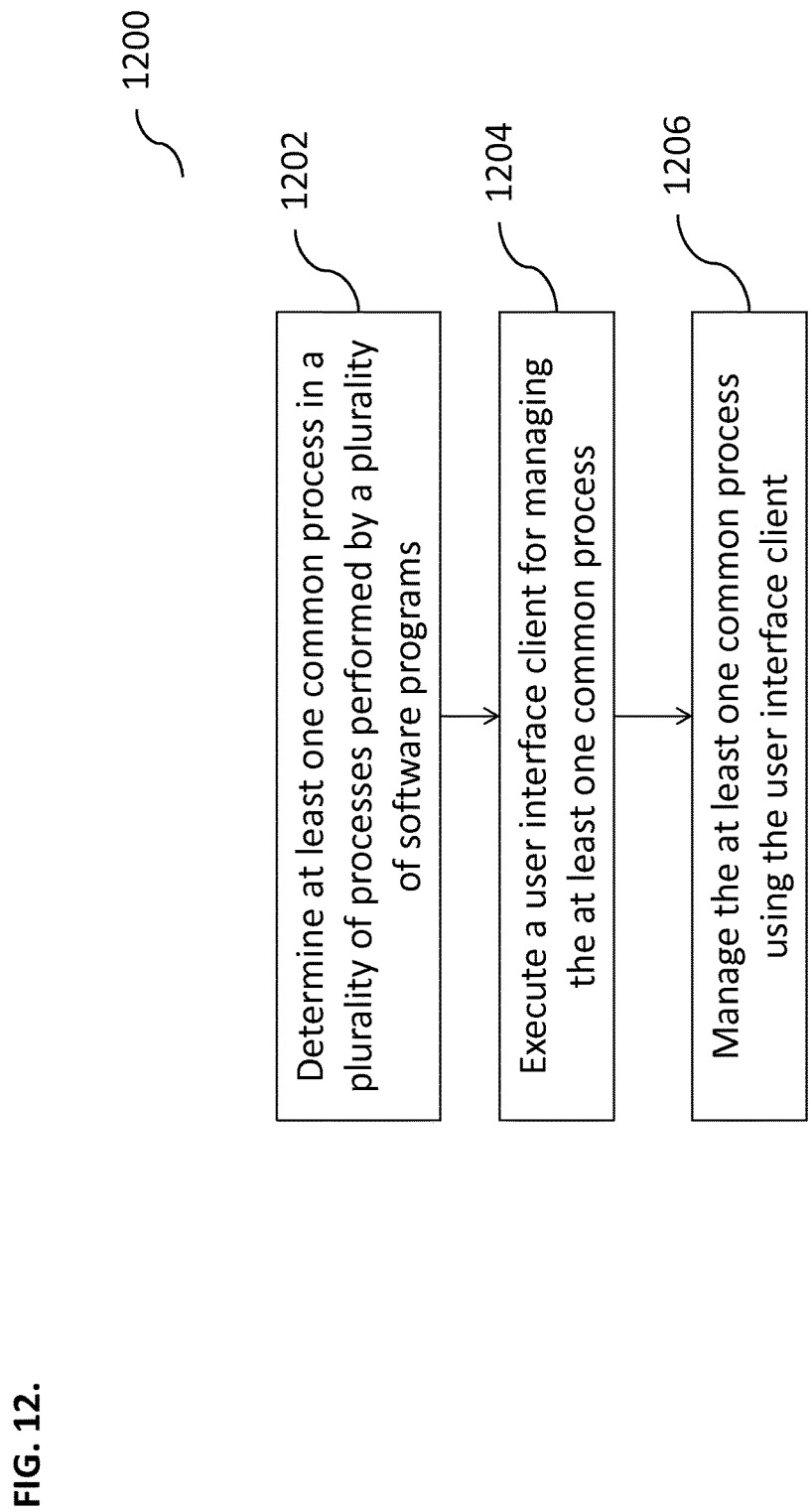
FIG. 12 is an exemplary method, according to some implementations of the current subject matter.

FIG. 12 illustrates an exemplary method 1200 for implementing a generic software logistics user interface client, according to some implementations of the current subject matter. At 1202, at least one common process in a plurality of processes performed by a plurality of software programs can be determined. At 1204, a user interface client can be executed for managing the at least one common process. At 1206, the common process can be managed using the user interface client.

In some implementations, the current subject matter can include one or more of the following optional features. In some implementations, the plurality of processes can include at least one of the following: an upgrade process, an update process, an installation process, a correction process, a transport process, and a configuration process. The managing can include at least one of the following: monitoring execution of the at least one process, configuring execution of the at least one process, error-handling of at least one error generated during execution of the at least one process and obtaining at least one parameter associated with execution of the at least one process.

In some implementations, the user interface can display a plurality of processes associated with the software program. The user interface can include at least one view for displaying at least one detail associated with execution of the at least one process.

In some implementations, the managing can include managing, using the user interface, at least one custom process associated with a software program in the plurality of software programs.

In some implementations, managing can include performing, using the user interface, at least one of the following: displaying a list of available processes associated with at least one software program in the plurality of software programs, wherein the processes are displayed using at least one of the following: a tree table format, a single process format, and a grouped process format; displaying at least one detail relating to a running process of at least one software program in the plurality of software programs; initiating execution of at least one process associated with at least one software program in the plurality of software programs; connecting to at least one executing process associated with at least one software program in the plurality of software programs; and executing a plurality of processes associated with at least one software program in the plurality of software programs.

In some implementations, managing can also include configuring, using the user interface, at least one parameter associated with at least one process of at least one software program in the plurality of software programs, where the configuring is performed using a dialog view associated with the user interface and generated based on a metadata description information associated with the at least one parameter.

In some implementations, managing can include controlling at least one element of at least one user interface dialog associated with the user interface. At least one element can include at least one of the following: a read only element, an editable single value element, a selectable value element, and a composition type element.

In some implementations, managing can further include monitoring, using the user interface, execution of at least one process associated with at least one software program in the plurality of software programs. Monitoring can include displaying status of at least one task performed by the at least one process in the user interface.

In some implementations, managing can include, using the user interface, display of at least one custom view displaying at least one detail of at least on process associated with at least one software program in the plurality of software programs. The custom view can be added in the user interface to at least one existing view. The existing view can be used to display at least one of the following: at least one detail of the at least one process designated for displaying in the existing view and at least one additional detail of the at least one process.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    determining, by at least one processor, at least one common process in a plurality of processes performed by a plurality of software programs, wherein the plurality of processes includes an upgrade process, an update installation process, a correction process, a transport process, and/or a configuration process;
    executing, by the at least one processor, a user interface client for managing the determined at least one common process;
    managing, by the at least one processor, the determined at least one common process using the executed user interface client, wherein the managing of the determined at least one common process comprises at least one of the following: monitoring execution of the at least one common process, configuring execution of the at least one common process, error-handling of at least one error generated during execution of the at least one common process, and obtaining at least one parameter associated with execution of the at least one common process, wherein the executed user interface client supports a plurality of user interface modes;
    identifying, by the at least one processor, the plurality of user interface modes based on a list of configuration options for executing the determined at least one common process, wherein the identifying of the plurality of user interface modes occurs during an initialization of the executed user interface client in a browser;
    determining, by the at least one processor, a view composition sequence based on a software logistics protocol for handling the identified plurality of user interface modes;
    displaying, by the at least one processor, at least one user interface mode of the identified plurality of user interface modes that renders a list of processes in the executed user interface client, wherein the rendering of the list of processes comprises:
        displaying a home view in the executed user interface client, wherein the home view including a trigger for execution of a first process of the list of processes and further including static information associated with the first process; and
        displaying an execution view in the executed user interface client, wherein the execution view comprising dynamic information associated with the first process, wherein the list of processes is associated with at least one software program in the plurality of software programs.

2. The method according to claim 1, wherein determining the view composition sequence comprises determining the home view and the execution view for the user interface mode.

3. The method according to claim 1, wherein the at least one user interface mode includes at least one view for displaying at least one detail associated with execution of the at least one common process.

4. The method according to claim 1, wherein the managing further comprises managing, using the executed user interface client, at least one custom process associated with a software program in the plurality of software programs.

5. The method according to claim 1, wherein the managing further comprises performing, using the executed user interface client, at least one of the following:
  displaying a list of available processes associated with at least one software program in the plurality of software programs, wherein the processes are displayed using at least one of the following: a tree table format, a single process format, and a grouped process format;
  displaying at least one detail relating to a running process of at least one software program in the plurality of software programs;
  initiating execution of at least one process associated with at least one software program in the plurality of software programs;
  connecting to at least one executing process associated with at least one software program in the plurality of software programs; and
  executing a plurality of processes associated with at least one software program in the plurality of software programs.

6. The method according to claim 1, wherein the managing further comprises configuring, using the executed user interface client, at least one parameter associated with at least one process of at least one software program in the plurality of software programs, where the configuring is performed using a dialog view associated with the user interface and generated based on a metadata description information associated with the at least one parameter.

7. The method according to claim 1, wherein the managing further comprises controlling at least one element of at least one user interface dialog associated with the at least one user interface mode;
  wherein the at least one element includes at least one of the following: a read only element, an editable single value element, a selectable value element, and a composition type element.

8. The method according to claim 1, wherein the managing further comprises monitoring, using the executed user interface client, execution of at least one process associated with at least one software program in the plurality of software programs;
  wherein the monitoring includes displaying status of at least one task performed by the at least one common process in the executed user interface client.

9. The method according to claim 1, wherein the managing further comprises, using the executed user interface client, displaying at least one custom view displaying at least one detail of at least one common process associated with at least one software program in the plurality of software programs, where the custom view is added in the user interface mode to at least one existing view, the at least one existing view is used to display at least one of the following: at least one detail of the at least one process designated for displaying in the existing view and at least one additional detail of the at least one common process.

10. A system comprising:
  at least one programmable processor; and
  a machine-readable medium storing instructions that, when executed by the at least one programmable processor, cause the at least one programmable processor to perform operations comprising:
    determining at least one common process in a plurality of processes performed by a plurality of software programs, wherein the plurality of processes includes an upgrade process, an update installation process, a correction process, a transport process, and/or a configuration process;
    executing a user interface client for managing the determined at least one common process;
    managing the determined at least one common process using the executed user interface client, wherein the managing of the determined at least one common process comprises at least one of the following: monitoring execution of the at least one common process, configuring execution of the at least one common process, error-handling of at least one error generated during execution of the at least one common process, and obtaining at least one parameter associated with execution of the at least one common process, wherein the executed user interface client supports a plurality of user interface modes;
    identifying the plurality of user interface modes based on a list of configuration options for executing the determined at least one common process, wherein the identifying of the plurality of user interface modes occurs during an initialization of the executed user interface client in a browser;
    determining a view composition sequence based on a software logistics protocol for handling the identified plurality of user interface modes;
    displaying at least one user interface mode of the identified plurality of user interface modes that renders a list of processes in the executed user interface client, wherein the rendering of the list of processes comprises:
      displaying a home view in the executed user interface client, wherein the home view including a trigger for execution of a first process of the list of processes and further including static information associated with the first process; and
      displaying an execution view in the executed user interface client, wherein the execution view comprising dynamic information associated with the first process, wherein the list of processes is associated with at least one software program in the plurality of software programs.

11. The system according to claim 10, wherein the determining the view composition sequence comprises determining the home view and the execution view for the user interface mode.

12. The system according to claim 10,
  wherein the at least one user interface mode includes at least one view for displaying at least one detail associated with execution of the at least one common process.

13. The system according to claim 10, wherein the managing further comprises performing, using the executed user interface client, at least one of the following:
  wherein the rendering of the list of processes includes using at least one of the following: a tree table format, a single process format, and a grouped process format;
  displaying at least one detail relating to a running process of the at least one software program in the plurality of software programs;
  initiating execution of at least one process associated with the at least one software program in the plurality of software programs;

connecting to at least one executing process associated with the at least one software program in the plurality of software programs; and executing a plurality of processes associated with the at least one software program in the plurality of software programs.

14. The system according to claim 10, wherein the managing further comprises, using the executed user interface client, at least one of the following:

configuring at least one parameter associated with at least one process of the at least one software program in the plurality of software programs, where the configuring is performed using a dialog view associated with the executed user interface client and generated based on a metadata description information associated with the at least one parameter;

controlling at least one element of at least one user interface dialog associated with the executed user interface client, wherein the at least one element includes at least one of the following: a read only element, an editable single value element, a selectable value element, and a composition type element.

15. The system according to claim 10, wherein the managing further comprises monitoring, using the executed user interface client, execution of at least one process associated with the at least one software program in the plurality of software programs;

wherein the monitoring includes displaying status of at least one task performed by the at least one common process in the executed user interface client.

16. The system according to claim 10, wherein the managing further comprises, using the executed user interface client, displaying at least one custom view displaying at least one detail of at least one process associated with the at least one software program in the plurality of software programs, where the custom view is added in the executed user interface client to at least one existing view, the at least one existing view is used to display at least one of the following: at least one detail of the at least one process designated for displaying in the existing view and at least one additional detail of the at least one process.

17. A computer program product comprising a non-transitory machine-readable medium storing instructions that, when executed by at least one programmable processor, cause the at least one programmable processor to perform operations comprising:

determining at least one common process in a plurality of processes performed by a plurality of software programs, wherein the plurality of processes includes an upgrade process, an update installation process, a correction process, a transport process, and/or a configuration process;

executing a user interface client for managing the determined at least one common process;

managing the determined at least one common process using the executed user interface client, wherein the managing of the determined at least one common process comprises at least one of the following: monitoring execution of the at least one common process, configuring execution of the at least one common process, error-handling of at least one error generated during execution of the at least one common process, and obtaining at least one parameter associated with execution of the at least one common process, wherein the executed user interface client supports a plurality of user interface modes;

identifying the plurality of user interface modes based on a list of configuration options for executing the determined at least one common process, wherein the identifying of the plurality of user interface modes occurs during an initialization of the executed user interface client in a browser;

determining a view composition sequence based on a software logistics protocol for handling the identified plurality of user interface modes;

displaying at least one user interface mode of the identified plurality of user interface modes that renders a list of processes in the executed user interface client, wherein the rendering of the list of processes comprises:

displaying a home view in the executed user interface client, wherein the home view including a trigger for execution of a first process of the list of processes and further including static information associated with the first process; and displaying an execution view in the executed user interface client, wherein the execution view comprising dynamic information associated with the first process, wherein the list of processes is associated with at least one software program in the plurality of software programs.

* * * * *